May 21, 1929.  W. SCHMUZIGER  1,714,482
DISCHARGING DEVICE FOR PAINTS AND THE LIKE
Filed Jan. 11, 1928
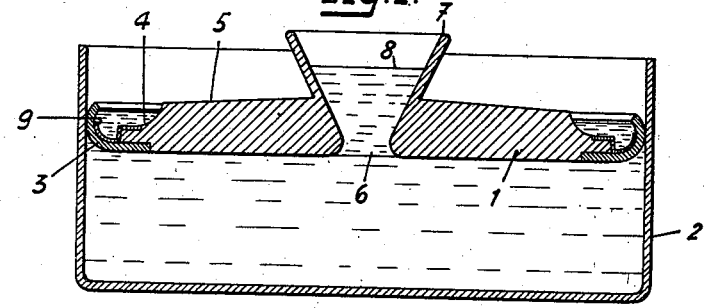
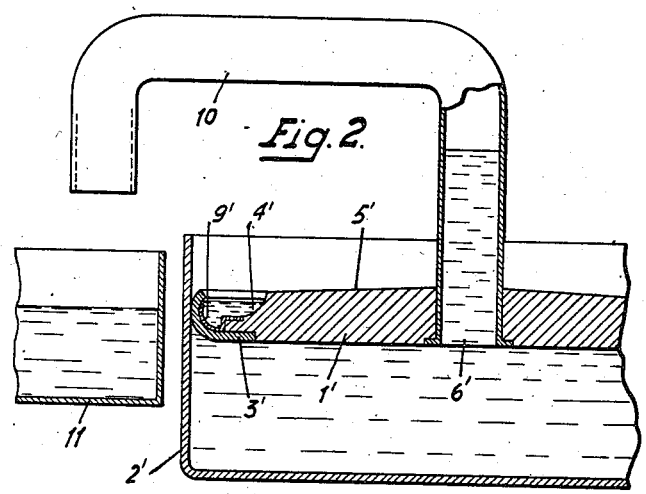
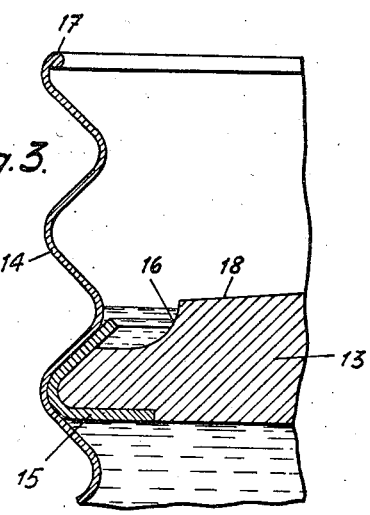

Patented May 21, 1929.

1,714,482

UNITED STATES PATENT OFFICE.

WILLY SCHMUZIGER, OF ZURICH, SWITZERLAND.

DISCHARGING DEVICE FOR PAINTS AND THE LIKE.

Application filed January 11, 1928, Serial No. 245,939, and in Switzerland May 28, 1927.

Devices have become known for discharging liquids, as paints and the like from cylindrical vessels by depressing a lid which covers the surface of the liquid. The device, according to the application, differs from these known constructions in that, on the edge of the lid, a lining of felt or similar material is arranged designed to absorb liquids which, as for instance oil, are capable to prevent sticking or drying of the paints and the like between the inner surface of the vessel and the lid. The movability of the lid in the vessel is thereby permanently ensured. In the upper surface of the lid an annular groove is further arranged, designed to hold the liquid which prevents the sticking and to supply this liquid to the felt lining.

The device, according to the invention differs further from the devices of known type in that the discharge-opening is arranged in the lid to facilitate the discharging.

Several embodiments of the invention are illustrated, by way of example, in the accompanying drawing in which:

Fig. 1 shows in vertical section a container with lid, constructed, according to the invention.

Fig. 2 shows in vertical section, partly in elevation, a portion of the container with lid and a tube in this lid for pouring the liquid into another container.

Fig. 3 is a vertical section showing a portion of a container with undulated wall and the corresponding portion of the rim of the lid.

In the container 2 shown in Fig. 1 a lid 1 is loosely placed on the liquid in the container. This lid has on the lower surface of its rim a lining 3 of felt or other suitable absorbing material and in its upper surface an annular groove 4, designed to be filled with a liquid which prevents the liquid in the container from sticking between the inner wall of the container and the rim of the lid. The top-surface 5 of the lid 1 is outwardly inclined from the center so that oil or other suitable liquid poured on will flow into the annular groove 4. The lid has a central opening 6, the edge of said opening being extended in upward direction to form a funnel 7.

By depressing lid 1 the liquid in the container rises through the opening 6 into the funnel 7 to the level 8. On the rim of the lid 1 in the annular groove 4 plate-springs 9 of convenient shape are arranged which are designed to press the lining 3 against the inner surface of the container wall.

According to Fig. 2 a vertical tube 10 is mounted in the central hole 6' of the lid and designed to be used for pouring the liquid, from the container over into another container 11.

According to Fig. 3 the wall 14 of the container is undulated the rim of the lid 13 being rounded in accordance with the undulations of the container-wall the lining 15 of felt or other suitable material being thus tightly pressed against the inner surface of the container-wall 14. The annular groove of the lid is designated by 16 and the inclined top-surface of the lid 13 by 18. The rim 17 of the container is curved inward.

I claim:—

1. A device for discharging liquids, as paints and the like, from cylindrical vessels by the depression of a lid onto the surface of the liquid in the container, comprising in combination a lid having a central hole and an annular groove in its rim said groove being filled with a liquid like oil, and a lining on the lower surface of the rim of said lid bent upwards at the outer edge to form the sidewall of said annular groove and consisting of a material capable of absorbing the liquid contained in said annular groove to prevent the container-liquid from sticking between the rim of said lid and the inner surface of the wall of said container.

2. A discharging device as specified in claim 1, comprising in combination with a lid having an annular groove in its rim and the lining on the lower surface of said lid, plate-springs in said annular groove bent so that they press said lining against the container-wall.

3. A discharging device as specified in claim 1, in which the upper surface of the lid is inclined downwardly from the centre in outward direction to make flow into the annular groove the oil poured on said upper surface.

In testimony whereof I affix my signature.

WILLY SCHMUZIGER.